United States Patent [19]

Kawaguchi et al.

[11] Patent Number: 5,500,563
[45] Date of Patent: Mar. 19, 1996

[54] STRUCTURE FOR CONNECTING ELECTRODES OF MOTOR UNIT AND MOTOR DRIVER UNIT

[75] Inventors: Kenji Kawaguchi, Wako; Yoshiyuki Miyaki, Hanno, both of Japan

[73] Assignees: Honda Motor Co., Ltd.; Shindengen Electric Manufacturing Co., Ltd., both of Tokyo, Japan

[21] Appl. No.: 197,833

[22] Filed: Feb. 17, 1994

[30]   Foreign Application Priority Data

Mar. 12, 1993   [JP]   Japan .................... 5-016500 U

[51] Int. Cl.$^6$ ............................................. H02K 11/00
[52] U.S. Cl. ............................................. 310/71; 310/68 R
[58] Field of Search ............................. 310/42, 68 R, 310/71

[56]                   References Cited

U.S. PATENT DOCUMENTS

| 4,668,898 | 5/1987 | Harms et al. ..................... 310/68 R |
| 5,027,026 | 6/1991 | Mineta et al. ....................... 310/42 |

FOREIGN PATENT DOCUMENTS

0531200A3   3/1993   European Pat. Off. .

3602606A1   7/1987   Germany .

*Primary Examiner*—Clayton E. LaBalle
*Attorney, Agent, or Firm*—Stevens, Davis, Miller & Mosher

[57]                       ABSTRACT

A structure for connecting electrodes of a motor unit and a motor driver unit which is a power circuit for the motor unit in an electric power drive vehicle, so that the motor unit and the motor driver unit are electrically connected to each other, includes: electrode terminals to which a coil of the motor unit is connected and which are provided with fixing nuts; substantially L-shaped electrode plates each formed at one end with a terminal portion connected to the inverter circuit and at the other end with a contact portion to which the electrode terminal is connected, the contact portion being formed with an insertion hole; L-shaped resin electrode bases for attaching the electrodes plates to a metallic frame under an insulated condition, each of the electrode bases including an elongated hole for attaching a bolt to be engaged with the insertion hole of the electrode plate and a guide groove for preventing the electrode plate from rotation; and bolts each extending through the elongated hole of the electrode base so as to connect the electrode terminal to the electrode plate.

11 Claims, 3 Drawing Sheets

STRUCTURE FOR CONNECTING ELECTRODES OF MOTOR UNIT AND MOTOR DRIVER UNIT

BACKGROUND OF THE INVENTION

1. Industrial Field of the Invention

The present invention relates to a structure for connecting electrodes of a motor unit and a motor driver unit which is a power circuit for the motor unit in an electric power drive vehicle, so that the motor unit and the motor driver unit are electrically connected to each other.

2. Description of the Prior Art

In a device employing a conventional structure for connecting electrodes of a motor unit and a motor driver unit, the motor unit 1 is located on the right side of the device in FIG. 4. A motor 3 is secured in a cylindrical casing 2 of the motor unit 1. The motor driver unit 6 covered with a cylindrical casing 5 is located on the left side of the device. The motor driver unit 6 is provided with an inverter circuit 4 for driving the motor 3. Both of the units are integrally coupled to each other by means of fixing screws 7. Connecting cables 9 of a driving coil 8 of the motor 3 are extended out of the casing 2. By way of example, as shown in FIG. 4, connection terminals 10 of the cables 9 are connected by nuts 13 to bolts 12 as connection terminals for the inverter circuit 4 which are provided on an outer peripheral surface of the casing 5 of the motor driver unit 6, with insulation bases 11 being interposed therebetween. Reference numeral 14 designates a motor drive shaft, numeral 15 designates a drive pulley, and numeral 16 designates a capacitor.

FIG. 5 illustrates another example of the conventional structure of electrically connecting the electrodes of the motor unit and the motor driver unit. More specifically, the connecting cables 9 of the driving coil 8 of the motor 3 are extended through the interior of the casing so as to be drawn out of the surface of the casing 5 for the motor driver unit 6 on the left side in the drawing. The connection terminals 10 of the connecting cables 9 are connected by the nuts 13 to bolts 17 as connection terminals for the inverter circuit 4 (not illustrated in FIG. 5), which bolts are provided on the left-side surface of the casing 5 with the insulation bases 11 being interposed therebetween. Secured to the other ends of the connection bolts 17 are electrode plates 19 comprising printed circuit boards on which power semiconductor elements are mounted, the electrode plates including terminal sections 18 to be connected to the inverter circuit 4. The connection cables 9 may be replaced by wiring metallic means 20 made of plate-like or linear conductors.

In any example of the conventional structure of connecting the electrodes of the motor unit and the motor driver unit to each other, which structure uses the connection cables 9 or the connection metallic means 20, the connection terminals 10 of the connection cables 9 or the connection metallic means 20 are connected by means of the nuts 13 to the bolts 12 or 17 provided as the connection terminals in the exterior of the casing 5 for the motor driver unit 6. With the above-described structures, a sufficient working efficiency is not obtained during the assembling or wiring. Also, it is necessary to overlay insulation covers on the connection terminals because the connection terminals are exposed to the exterior of the unit. The conventional structure possesses various problems such that the exposed connection terminals are factors of obstructing the unit from being reduced in size and weight, and further that the exposed connection terminals are not favorable from the viewpoint of design.

In view of the above-mentioned problems of the prior art, the present invention aims to improve a working efficiency during assembling and wiring, to reduce the unit in size and weight by providing connection terminals not to be exposed to the exterior of the unit, and to obtain a unit which is excellent in design at a low cost.

SUMMARY OF THE INVENTION

According to the present invention, there is provided a structure for electrically connecting a motor unit constituting a motor and a motor driver unit constituting an inverter circuit for driving the motor. The structure comprises: electrode terminals to which a coil of the motor unit is connected and which are provided with nuts to be engaged with fixing bolts; substantially L-shaped electrode plates each formed at its one end with a terminal portion connected and secured to the inverter circuit of the motor driver unit and at the other end with a contact portion to which the coil terminal of the motor unit is connected, the contact portion being formed with an attachment hole; and L-shaped resin electrode bases for attaching these electrode plates to a metallic frame of the motor driver unit under an insulated condition, each of the electrode bases including an elongated hole for attachment of the bolt to be engaged with the insertion hole of the electrode plate and a guide groove for preventing the electrode plate from rotation. Each of the bolts extends through the elongated hole of the electrode base so as to be screwedly engaged with the nut of the electrode terminal, so that the electrode terminal is electrically connected to the electrode plate.

In the above structure, the elongated hole of the electrode base includes a metallic collar fixedly inserted therein.

Alternatively, a cylindrical hole may be directly formed as the elongated hole through the electrode base.

Further, in the case where the electrode terminal is formed of a thick member, a female screw may be directly cut in the electrode terminal in place of the nut.

DETAILED DESCRIPTION OF THE PREFERRED EMBODIMENT

Figure 1:
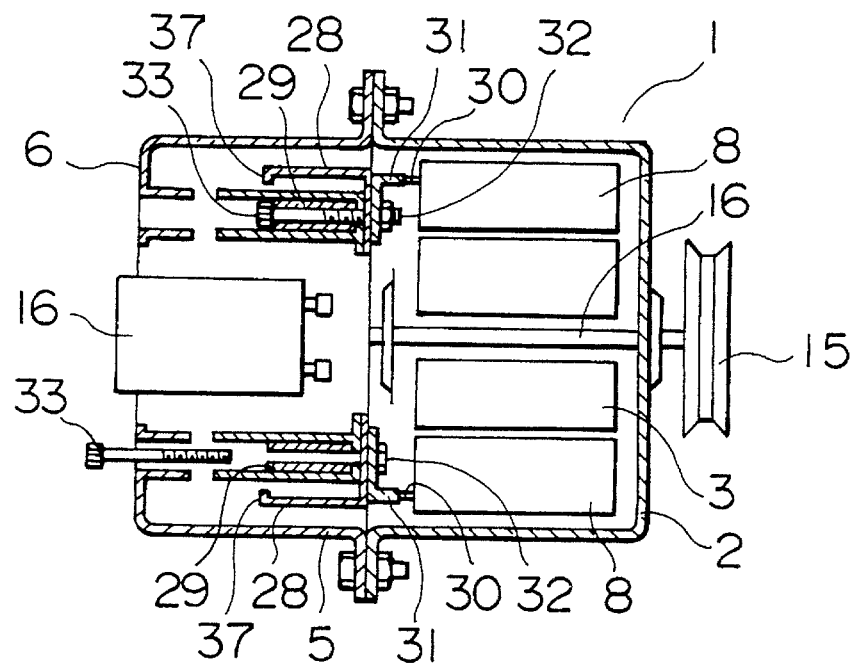
FIG. 1 is a schematic view of inner structures of both of a motor unit and a motor driver unit according to one embodiment of the invention.

One preferred embodiment of the invention will now be described with reference to the drawings. Like reference numerals indicate like elements in the drawings which show the invention and the prior art.

Figure 3:
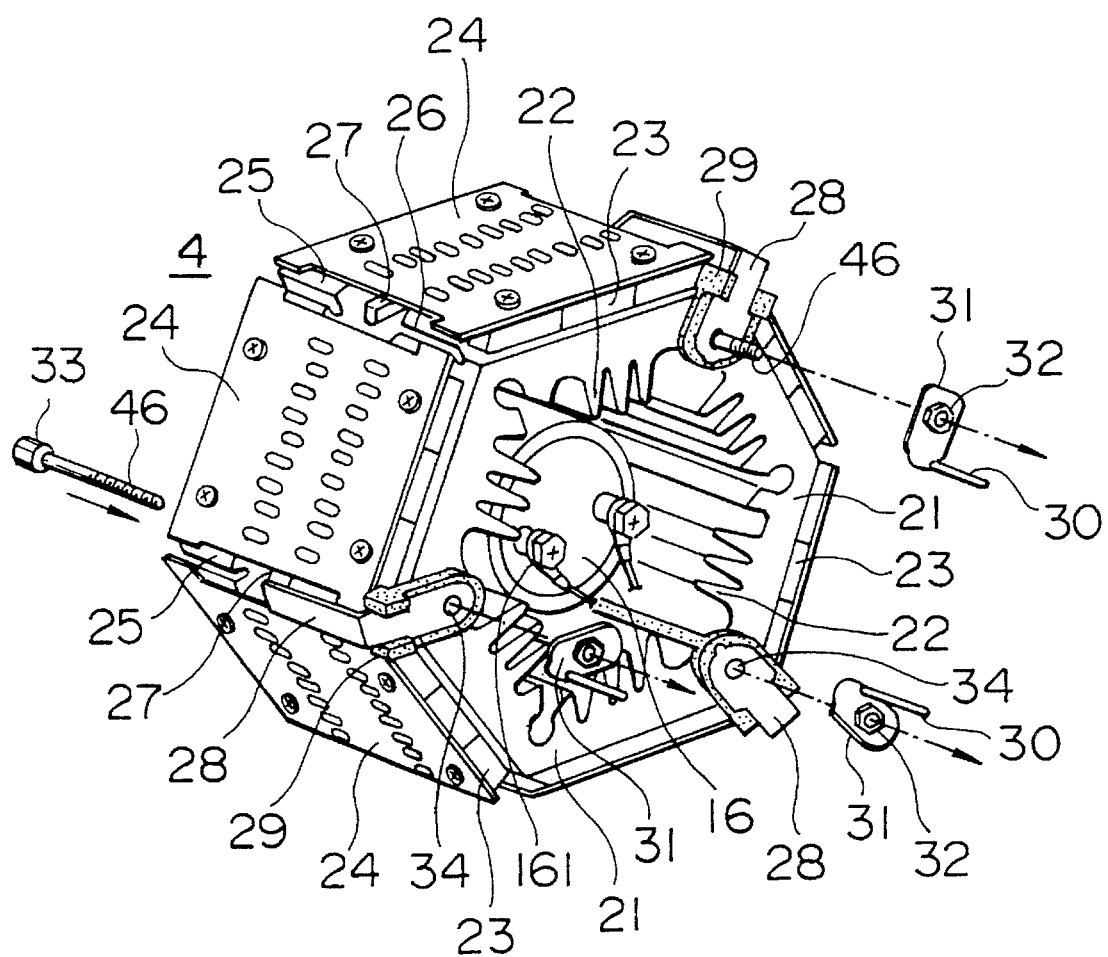
FIG. 3 is a perspective view illustrative of the motor driver unit, for explanation of the connecting structure of the invention.
Figure 4:
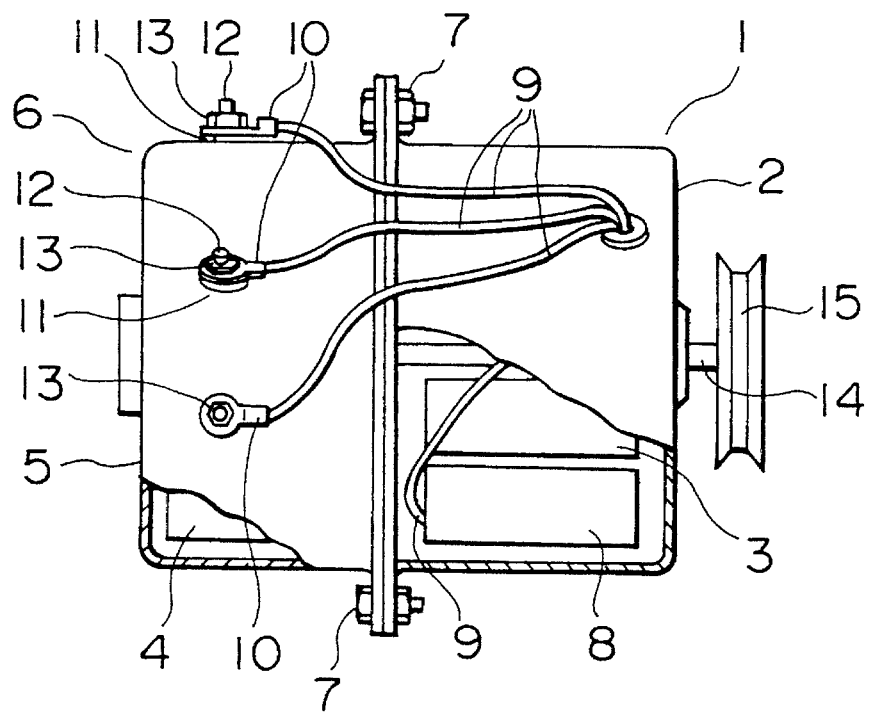
FIG. 4 is a partially cut-out side view of both a motor unit and a motor driver unit, showing one example of a conventional connecting structure in the prior art.
Figure 5:
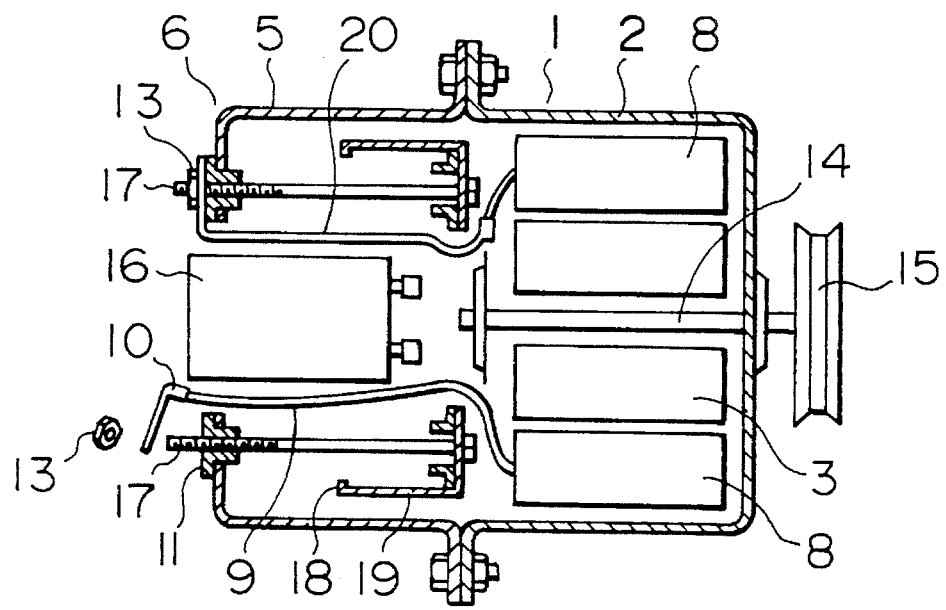
FIG. 5 is a schematic view of inner structures of both the units, showing another example of the conventional connecting structure in the prior art.

An interior structure of a motor driver unit 6 of an electric power drive vehicle according to the invention, that is, a structure of an inverter circuit, is schematically illustrated in FIG. 3. Reference numeral 21 designates a hexagonal metallic frame which is manufactured by integral molding or which is an assembly of separated parts. The frame 21 includes a number of radiation fins 22 for cooling semiconductor elements extending from an inner peripheral surface of the frame 21. Printed circuit boards 24 on which the power semiconductor elements 23 are mounted are attached to an outer peripheral surface of the frame 21, the printed circuit boards 24 constituting the inverter circuit for driving a motor 3. These printed circuit boards 24 are respectively attached with electrode bus bars 25, 26 and 27 which connect the power semiconductor elements to one another in parallel. Numeral 25 is an anode bus bar, numeral 26 is a cathode bus bar, and numeral 27 is a bus bar to be connected with the motor.

Next, a description will be given to a structure of connecting the electrodes according to the invention. Electrode plates 28 for supplying power to the motor are fixed by soldering to the bus bars 27 to be connected with the motor. The electrode plates 28 are mounted on the metallic frame 21, with resin electrode bases 29 being interposed between the electrode plates and the frame, for the purpose of retaining the electrode plates 28 in an insulated condition from the metallic frame 21.

Electrode terminals 31 are attached to top ends of leading wires 30 of a driving coil 8 of a motor unit 1, in order to connect the electrode terminals 31 to the electrode plates 28. The electrode terminals 31 include nuts 32 securely attached thereto. The electrode terminals 31 are so positioned as to correspond to insertion holes 34 formed in the electrode plates 28.

Referring to FIG. 3, there is illustrated a bolt 33 to be screwed into the nut 32 fixed on the electrode terminal 31 from the left side of the metallic frame 21 in the drawing. The bolt 33 extends through the interior of the metallic frame 21 and an attachment hole of the electrode base 29, thereby connecting the electrode plate 28 and the electrode terminal 31 to each other.

The above-described structure will be explained in detail with reference to FIGS. 1 and 2. For clarification of the drawing, the inverter circuit 4 accommodated in the motor driver unit 6 is omitted from FIG. 1.

Figure 2:
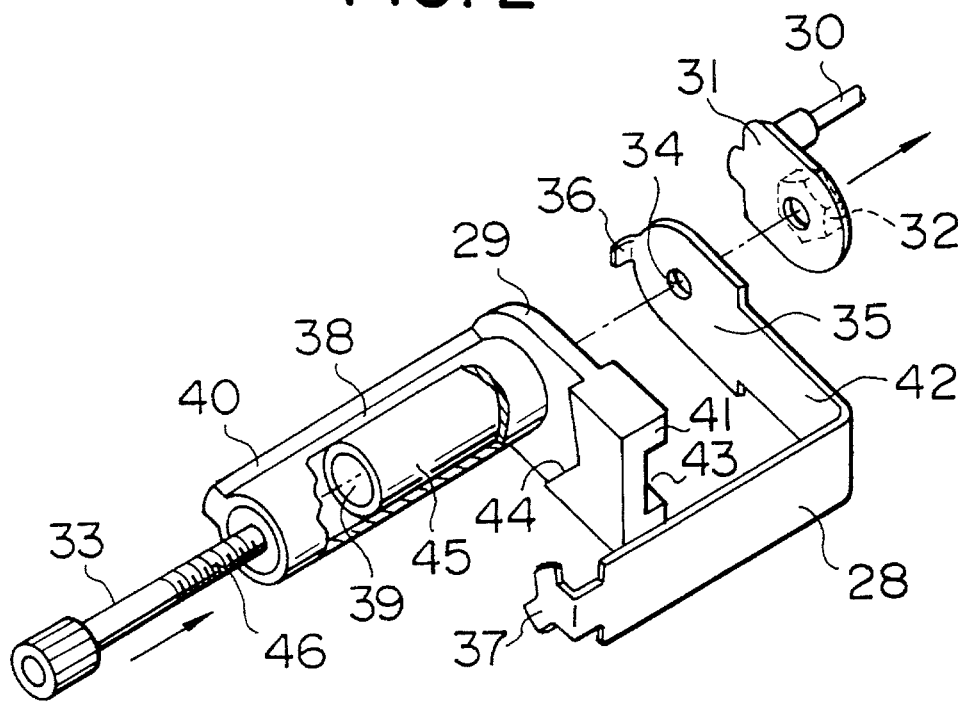
FIG. 2 is a perspective view showing essential portions of the connecting structure of the invention.

Referring to FIG. 2, the electrode plate 28 is formed substantially in an L-shape. The electrode plate 28 is formed at its one end with a contact portion 35 including an insertion hole 34 for the bolt 33. The contact portion 35 includes a positioning projection 36 formed at the top end so that the insertion hole 34 will accurately occupy a desirable position. The electrode plate 28 is also formed at the other end with a slightly-bent terminal portion 37 to be connected and secured to the motor connecting bus bar 27 by soldering.

The resin electrode base 29 is also formed in an L-shape. The resin electrode base 29 includes an upright portion 38 through which an elongated hole 39 for insertion of the bolt 33 passes. A rotation restricting ridge 40 is provided on the outside of the elongated hole 39. A guide groove 43 which engages with a reduced-width portion 42 leading to the contact portion 35 of the electrode plate 28 is formed on a surface of an end portion 41 of the L-shaped electrode base 29. Thus, the electrode plate 28 is prevented from being misplaced on the electrode base 29 when the electrode plate 28 is superposed on the electrode base 29.

A V-shaped stepped portion 44 which engages with a corner of the hexagonal metallic frame 21 is provided on the opposite surface or the other surface of the end portion 41 of the electrode base 29. When the upright portion 38 of the electrode base 29 is inserted into an attachment portion of the metallic frame 21, the electrode base 28 will not mismatch with the metallic frame 21 thanks to the ridge 40 and the stepped portion 44.

A metallic collar 45 is contained within the elongated hole 39 for insertion of the bolt 33 in the electrode base 29. If the material of the electrode base 29 has strength enough to withstand against tightening of the bolt 33, in place of the metallic collar 45, a cylindrical portion which fulfills a function similar to that of the collar 45 may be formed in the elongated hole 39 for insertion of the bolt 33.

In a step of assembling the units having the aforesaid structure, at first, the electrode plate 28 is superposed on the electrode base 29, and the terminal portion 37 of the electrode plate 28 is electrically connected and mechanically fixed to the motor connecting bus bar 27 of the motor driver unit 6 by soldering.

Then, the metallic collar 45 is inserted into the elongated hole 39 of the electrode base 29. The bolt is further inserted into the elongated hole 39. The bolt 33 extends through the insertion hole 34 of the electrode plate 28, and a thread portion 46 of the bolt 33 is screwedly engaged with the nut 32 securely attached to the electrode terminal 31 of the driving coil 8, whereby the electrode base 29, the electrode plate 28 and the electrode terminal 31 are tightly clamped to one another by the bolt 33. Consequently, the power circuit 4 is electrically connected to the driving coil 8 of the motor 3 because the electrode plate 28 and the electrode terminal 31 are connected to each other.

As clearly understood from FIG. 1, the power circuit 4 can be connected to the driving coil 8 of the motor 3 under such a condition that the leading wires of the driving coil 8 are not extended out of the motor unit and the connection terminals 10 are not exposed to the exterior of the casing 5 of the motor driver unit 6.

In the illustrated embodiment, the nut 32 is securely fixed to the electrode terminal 31 of the driving coil 8. However, in the case where the electrode terminal 31 is made of a thick member, a female screw may be directly formed in the terminal by cutting. In this case, the nut 32 may be omitted.

As apparent from the above description, the present invention makes it possible to electrically connect the motor unit and the motor driver unit within the interiors of both units. Since the connection between both the units is performed by inserting the connecting bolt from the exterior of the motor driver unit so as to be screwedly engaged with the nut of the electrode terminal of the driving coil, the assembling and wiring work is made extremely easy so that the efficiency of the assembling and wiring work can be improved. The invention also provides a practical effect to enhance a value of a product which employs the above-described units. Accordingly, it is unnecessary to provide an insulation cover on the electrode connecting structure because the leading wires are not extended out of the unit and the connection terminals are not exposed to the exterior of the unit.

Although the preferred embodiment of the invention has been shown and described, it should be understood that various modifications and rearrangements of the parts may be resorted to without deviating from the scope of the invention as disclosed and claimed herein.

What is claimed is:

1. A structure for electrically connecting a motor unit comprising a motor and a motor driver unit for driving said motor, said structure comprising:

a fixing bolt;

an electrode terminal which is for being connected to a coil of the motor unit and which is provided with fixing means for screwedly engaging with the fixing bolt;

a substantially L-shaped electrode plate having a first end and a second end and formed at the first end with a terminal portion for being connected and secured to the motor driver unit and at the second end with a contact portion to which the electrode terminal is connected, said contact portion being formed with an attachment hole; and a substantially L-shaped resin electrode base for attaching said electrode plate to a frame of the motor driver unit under an insulating condition, said electrode base including an elongated hole for attachment of the fixing bolt to be engaged with the insertion hole of the electrode plate;

said bolt extending through the elongated hole of the electrode base and through the attachment hole so as to be screwedly engaged with the fixing means of said electrode terminal, so that the electrode terminal is electrically connected to the electrode plate.

2. A structure according to claim 1, wherein the elongated hole of the electrode base includes a metallic collar fixedly inserted into the elongated hole.

3. A structure according to claim 1, wherein a cylindrical hole is directly formed as the elongated hole through the electrode base.

4. A structure according to claim 1, wherein said filing means comprises a female screw directly cut in the electrode terminal.

5. A structure according to claim 1, wherein the fixing means comprises a nut.

6. A structure according to claim 1, wherein the electrode base includes a guide groove for preventing the electrode plate from rotating.

7. A structure according to claim 6, wherein the electrode plate comprises a reduced-width portion which is narrower than said contact portion, said reduced-width portion being adapted to be received in said guide groove.

8. A structure according to claim 1, wherein said electrode base comprises a rotation-restricting ridge which is adapted to be received in said frame.

9. A structure according to claim 1, wherein the electrode base comprises:

a first portion adapted to face the contact portion of the electrode plate; and a second portion extending substantially perpendicularly to the first portion and having said elongated hole formed in said second portion.

10. A structure according to claim 9, wherein said first portion of said electrode base has a guide groove for preventing the electrode plate from rotating.

11. A structure according to claim 10, wherein the electrode plate comprises a reduced-width portion which is narrower than said contact portion, said reduced-width portion being adapted to be received in said guide groove.

* * * * *